US012480791B2

(12) United States Patent
Smithson

(10) Patent No.: US 12,480,791 B2
(45) Date of Patent: Nov. 25, 2025

(54) SYSTEM AND METHOD FOR MONITORING BUILDINGS INCLUDING FACADES

(71) Applicant: Peter John Smithson, Lower Plenty (AU)

(72) Inventor: Peter John Smithson, Lower Plenty (AU)

( * ) Notice: Subject to any disclaimer, the term of this patent is extended or adjusted under 35 U.S.C. 154(b) by 346 days.

(21) Appl. No.: 18/002,307

(22) PCT Filed: Jun. 18, 2021

(86) PCT No.: PCT/AU2021/050634
§ 371 (c)(1),
(2) Date: Dec. 19, 2022

(87) PCT Pub. No.: WO2021/253092
PCT Pub. Date: Dec. 23, 2021

(65) Prior Publication Data
US 2023/0349736 A1 Nov. 2, 2023

(30) Foreign Application Priority Data

Jun. 19, 2020 (AU) ................................ 2020204132

(51) Int. Cl.
*G01D 21/00* (2006.01)
*H04W 4/38* (2018.01)
(Continued)

(52) U.S. Cl.
CPC .............. *G01D 21/00* (2013.01); *H04W 4/38* (2018.02); *G01N 33/0075* (2013.01); *G05B 19/048* (2013.01); *H04L 67/12* (2013.01)

(58) Field of Classification Search
USPC ........................................................ 702/182
See application file for complete search history.

(56) References Cited

U.S. PATENT DOCUMENTS

2014/0303788 A1 10/2014 Sanders et al.
2015/0097678 A1 4/2015 Sloo et al.
(Continued)

FOREIGN PATENT DOCUMENTS

| CN | 106958913 A | 7/2017 |
| KR | 20200036703 A | 4/2020 |

OTHER PUBLICATIONS

International Search Report for corresponding International Application No. PCT/AU2021/050634 mailed Aug. 6, 2021.
(Continued)

*Primary Examiner* — Paul D Lee
(74) *Attorney, Agent, or Firm* — Chrisman Gallo Tochtrop LLC

(57) ABSTRACT

A computer-implemented system including a plurality of environmental parameter sensors affixed to, or associated with, a building including a plurality of sensors affixed to components of the building façade and configured to continuously monitor one or more environmental parameters; the plurality of sensors in data communication with a data recordal device configured to capture sensor data generated by the plurality of sensors; and a computing device in communication with the data recordal device including one or more processors that receive and process the sensor data captured by the data recordal device to thereby assess the performance of the building façade.

8 Claims, 5 Drawing Sheets

(51) Int. Cl.
  *G01N 33/00* (2006.01)
  *G05B 19/048* (2006.01)
  *H04L 67/12* (2022.01)

(56) References Cited

U.S. PATENT DOCUMENTS

| | | |
|---|---|---|
| 2016/0054910 A1 | 2/2016 | Hughes et al. |
| 2016/0104250 A1* | 4/2016 | Allen .................... G06Q 40/08 |
| | | 705/50 |
| 2017/0180147 A1* | 6/2017 | Brandman ............. G08B 21/20 |
| 2018/0294995 A1* | 10/2018 | Stamatakis ......... H04L 12/2825 |
| 2019/0103986 A1 | 4/2019 | Brandman et al. |
| 2019/0302709 A1 | 10/2019 | Vitullo |
| 2023/0368318 A1* | 11/2023 | Cope ..................... G16H 50/30 |

OTHER PUBLICATIONS

Written Opinion for corresponding International Application No. PCT/AU2021/050634 dated Aug. 6, 2021.
International Preliminary Report on Patentability for corresponding International Application No. PCT/AU2021/050634 dated Oct. 10, 2022.

* cited by examiner

SYSTEM AND METHOD FOR MONITORING BUILDINGS INCLUDING FACADES

CROSS-REFERENCE TO RELATED APPLICATIONS

This application is a national stage entry of International Application No. PCT/AU2021/050634 filed on Jun. 18, 2021, which claims the benefit of priority to Australian Application No. 2020204132, filed Jun. 19, 2020, the entire disclosures of which are hereby incorporated herein by reference.

FIELD OF THE INVENTION

The present invention relates to a system and method for monitoring, recording and analyzing data associated with selected locations of buildings where such data is relevant to the thermal performance, energy, comfort and/or safety of the building occupants and includes monitoring and recording environmental parameters to which the building is subjected.

BACKGROUND OF THE INVENTION

Building façades (exterior walls or faces of buildings) are designed in accordance with various specifications to comply with prescribed energy rating and building codes/standards that are intended to provide a minimum energy efficiency performance for newly installed premises and renovations to existing buildings. It is also anticipated that newly installed or renovated buildings will meet, or exceed, various energy efficiency requirements for the entire service life of the building or at least from construction to the first contractually agreed maintenance date.

The façade of a building is an important aspect of the building since facades are a significant cause of buildings failing to ensure adequate thermal performance which may adversely affect the energy, comfort and/or safety aspects of the building.

Thermal energy parameters and building performance should be monitored throughout the service life of a building and this task represents a significant cost when the measurement of relevant parameters are manually collected. It is particularly important to monitor environmental parameters in the case of large/tall buildings, such as curtain wall high-rise towers, which, unless meticulously designed, fabricated and installed may perform comparatively poorly from a thermal performance perspective due to the large number of windows (or the large surface area of glazing) in the building façade which, if adequately designed, fabricated and installed are prone to thermal leakage in cold weather and sub-optimal thermal insulation in warm weather. Of course, for larger buildings with significant external glazed surface area, the cost associated with monitoring performance is greater in view of the need to monitor/measure more locations on/in the building.

Despite the above mentioned thermal performance requirements for newly installed and renovated existing buildings, currently, there is no existing method to efficiently and cost effectively monitor the thermal, energy, comfort and/or safety performance of a building over time. Typically, the thermal performance of a building façade is estimated prior to construction by theoretical calculation (modelling) with the actual performance typically indirectly measured after construction. However, this estimation process does not provide information relating to a building façade's performance, as installed, over the service life of the building. This is problematic since over time, a façade will experience a decrease in performance due to both weathering and normal wear and tear processes.

Moreover, it is presently not possible to confirm compliance, or obtain evidence of compliance, regarding the thermal performance of a façade upon completion of a building across all relevant environmental parameters in respect of which the building façade must perform and remain within defined parameters to satisfy contractual obligations.

Whilst it is possible to measure the performance efficiency of a façade by conducting discrete measurements manually over the service life of a building, such methods are infrequently adopted since they are disruptive, labour intensive and expensive. Accordingly, a decrease in the thermal performance of a building often remains undetected which typically results in higher energy consumption costs and lower levels of comfort experienced by building occupants. In some instances, thermal performance may decrease to an extent that the capacity of building systems such as the heating/ventilation/air conditioning system is of insufficient capacity to address the reductions in the thermal performance and hence cause a health and safety concern for the inhabitants of the building. A significant failure in building performance can lead to a legal liability on the part of the building owner who may be subject to monetary claims for failure to maintain the building within agreed parameters.

Due to the total absence of, or infrequent collection of, data relevant to thermal performance, energy, comfort and/or safety using presently available methods, a further disadvantage is the difficulty associated with collecting sufficient data points to thereby enable meaningful conclusions to be drawn regarding the performance of a building over time and under different environmental conditions. Infrequent data collection with respect to building performance also prevents the prediction of future building façade performance over time and under different environmental conditions and any ability to provide warnings and/or recommended corrective action measures to address expected and/or predicted failures or reductions in performance.

The cost associated with manual collection and monitoring of parameters affecting the performance of a building generally results in a lack of monitoring across all relevant parameters including those associated with thermal performance, energy, comfort and safety.

Of course, whilst collecting data comprising measurements of various parameters from a large number of sensors continuously over time will provide more information, such collection creates another problem arising from the substantial amounts of data and how to manage the data including storage and transfer. With the advent of a large number of video streaming services, the available bandwidth across publicly available data communications networks is becoming increasingly challenged. This problem associated with publicly available data communications networks further exacerbates the problem regarding detection of building performance failures that affect safety and thus require urgent attention.

Whilst most data collected from sensors located throughout a building may be collected and processed over a period of time, in the event that a sensor detects a condition or state that represents an imminent safety threat, this data should not be subject to any delay that may otherwise be tolerable for other environmental parameter data.

Accordingly, there is a need for a system and method that enables efficient and frequent measurement of sensor data pertaining to the performance of buildings.

The system, device and method of the present invention seek to address the above identified problems or at least provide an alternative solution to same.

The reference to any prior art in this specification is not, and should not be taken as, an acknowledgement or any suggestion, that the prior art forms part of the common general knowledge of skilled readers.

SUMMARY OF THE INVENTION

In one aspect, the present invention provides a computer-implemented system including, a plurality of sensors affixed to, or associated with, a building including a plurality of sensors affixed to components of the building façade and configured to continuously monitor one or more parameters including environment parameters, the plurality of sensors in data communication with a data recordal device configured to capture sensor data generated by the plurality of sensors, and an analysis device in communication with the data recordal device including one or more processors that process the sensor data captured by the data recordal device to thereby assess the performance of the building, wherein the sensors include at least one or more sensors to detect parameters relevant to safety including sensors to detect seismic activity, sensors to detect building differential movement, or sensors to detect air quality, wherein the sensors are categorized according to the parameter sensed and those parameters that could affect safety are flagged and when the parameter value received by the recordal device from a flagged sensor that includes a value representing an unsafe condition, the recordal of that event is flagged as an event potentially affecting safety, and wherein the sensor data recorded in the recordal device is transferred to the analysis device periodically except for flagged data representing an event that could represent an unsafe condition and in the event of the recordal device recording such an event, the corresponding sensor data is immediately transferred to the analysis device.

In an embodiment, the sensor data recorded by flagged sensors is captured continuously and transferred to the data recordal device substantially in real-time.

In an embodiment, the sensor data recorded by sensors other than the flagged sensors and captured by the data recordal device is periodically transferred automatically to the analysis device at scheduled times or within a scheduled time period.

In a preferred embodiment, the data recordal device is in operable communication with the plurality of building sensors by means of a private data communications network. Further, the analysis device is in operable communication with the data recordal device by means of a public data communications network. In this embodiment, transfer of data from the data recordal device to the analysis device occurs by means of a public data communications network. Connection of the analysis device to a public data communications network enables the results of any analysis to be accessed by any device that is configured to access the publicly accessible data communications network.

In an embodiment, the scheduled time or time period is a non-peak network traffic time or period. In this regard, the skilled reader will appreciate that by scheduling the automatic transfer of sensor data from the recordal device to the analysis device during a non-peak period, higher transfer rates are able to be achieved which also has the effect of conserving bandwidth and computer resources during times of peak traffic.

In an embodiment, the one or more environmental parameters for which a sensor collects data include any one of an incident solar radiation, transmitted solar radiation, thermal transmittance, solar heat gain coefficient, façade permeability parameters and wind load. The environmental parameters in respect of which sensors collect data may also include moisture, air flow, air quality and colour of surfaces of physical objects.

Other sensors may be affixed to, or located within, close proximity of a building including seismic sensors and building differential movement sensors. Seismic sensors record tremors and earthquake activity whereas differential movement sensors may detect a range of events including strain/deformation with respect to any aspect of a building to which the sensor is attached. In an exemplary embodiment, a differential movement sensor could be affixed to building structural members or façade system structural members to detect dimensional, including differential changes that may be precursors to the buckling of the building façade or to local or major structural collapse caused, for instance, by inadequacies in design, inadequacies in installation technique or changes in ground conditions.

The comfort of a building is substantially determined by the temperate and fresh air flow within inhabited spaces.

The installation of a range of different environmental parameter sensors improves the extent to which the dermal performance of a building may be assessed. For example, incident and transmitted solar radiation sensors assist to detect the possibility that as-installed glazing units have failed and require replacement. Similarly, moisture detection may highlight a façade fabrication defect such as a deteriorating seal or detect a leaking gasket. A flow detection may also highlight a façade fabrication defect such as a deteriorating gasket or bead of small joint sealant. The on-going safety of a building includes assessments regarding air quality and may include detection of carbon dioxide, carbon monoxide and/or ozone in inhabited spaces which may highlight inadequacies in the heating/ventilation/airconditioning system including inadequate air-mixing in habitable spaces, contamination of fresh air intakes and re-entrainment of air exhausted from the building.

In an embodiment, the computer-implemented system further includes one or more databases in which specification data relating to the one or more environmental parameters are stored, and the analysis module compares the sensor data captured by the data recordal device with the specification data.

In an embodiment, the computer-implemented system further includes an expert system module which assesses the recorded data and reports the likely cause of problems and/or the potential that a problem will occur at a future time. The expert system module may provide one or more recommendations for corrective action based upon the comparison of the collected sensor data and the specification data. The corrective action may relate to the building to which sensors have been attached and for which data has been collected and analyzed. However, in embodiments, the data collected, analyzed and assessed regarding the requirement for pro-active corrective action is applied to other buildings which are located in close proximity to the building for which data has been collected. Additionally or alternatively, the pro-active corrective action could be applied to other buildings which are exposed to environment parameters as compared with the building for which data monitoring, analysis and assessment has occurred.

In this embodiment, these events categorized as high urgency are transmitted to the analysis device without the delay applied to data of lesser urgency such that the event may be notified to relevant personnel (including emergency personnel if required) as quickly as possible. In this embodiment, urgent event data is transmitted without any other data without delay to the module which is configured to recognize those events with high urgency and the analysis module sends notifications to relevant devices regarding the detected event.

In another embodiment, urgent event data is transmitted to the analysis module across the usual data communications network that is used to communicate all recorded data but in addition, alternative data communications networks such as 4G/5G mobile phone network is used to transmit urgent event data to devices.

In another embodiment, the sensor data collected by the data recordal device is categorized according to the urgency in respect of which the data should be notified to relevant personnel. Generally, the urgency of collected data regarding notification relates to the extent to which the event detected by the data could impact the safety of building inhabitants and other persons such as pedestrians and/or motorists who are in sufficiently close proximity to the building such that their health and/or safety could be affected.

In another aspect, the present invention provides a computer-implemented method including, continuously monitoring, by a plurality of sensors affixed to, or associated with, a building including a plurality of sensors affixed to components of the building façade, one or more parameters including environmental parameters, wherein the plurality of sensors are in data communication with a data recordal device configured to capture sensor data generated by the plurality of sensors, transferring the sensor data to an analysis device that is in communication with the data recordal device, and processing, by one or more processors associated with the analysis device, the sensor data captured by the data recordal device to thereby assess the performance of the building, wherein the sensors include: at least one or more sensors to detect parameters relevant to safety including: sensors to detect seismic activity, sensors to detect building differential movement, or sensors to detect air quality, categorizing the sensors according to the parameter sensed and flagging those parameters that could affect safety, and when the parameter value is received by the recordal device from a flagged sensor that includes a value representing an unsafe condition, flagging the recordal of that event as an event potentially affecting safety, and transferring the sensor data recorded in the recordal device to the analysis device periodically except for flagged data representing an event that could represent an unsafe condition, and in the event of the recordal device recording such an event, immediately transferring the corresponding sensor data to the analysis device.

In a further aspect, the present invention provides a computer-readable medium having a plurality of instructions executable by one or more processors of a computing device to perform the steps of continuously monitoring, by a plurality of sensors affixed to, or associated with, a building including a plurality of sensors affixed to components of the building façade, one or more parameters including environmental parameters, wherein the plurality of sensors are in data communication with a data recordal device configured to capture sensor data generated by the plurality of sensors, transferring the sensor data to an analysis device that is in communication with the data recordal device, and processing, by one or more processors associated with the analysis device, the sensor data captured by the data recordal device to thereby assess the performance of the building, wherein the sensors include: at least one or more sensors to detect parameters relevant to safety including: sensors to detect seismic activity, sensors to detect building differential movement, or sensors to detect air quality, categorizing the sensors according to the parameter sensed and flagging those parameters that could affect safety, and when the parameter value is received by the recordal device from a flagged sensor that includes a value representing an unsafe condition, flagging the recordal of that event as an event potentially affecting safety, and transferring the sensor data recorded in the recordal device to the analysis device periodically except for flagged data representing an event that could represent an unsafe condition, and in the event of the recordal device recording such an event, immediately transferring the corresponding sensor data to the analysis device.

BRIEF DESCRIPTION OF THE DRAWINGS

Embodiments of the invention will now be described in further detail with reference to the accompanying Figures in which.

DETAILED DESCRIPTION OF EMBODIMENT(S) OF THE INVENTION

The present invention relates to a system and method for monitoring and recording sensor data generated with respect to buildings including building façades and in particular, parameters that typically affect the thermal performance of the building, the comfort of the building inhabitants, the energy usage and/or safety. The system and method includes associating with, or affixing to, a building (10), including the building façade (20) of the building, a plurality of sensors (40), which continuously monitor one or more parameters including environmental parameters. Such parameters may include, but are not limited to, incident or solar radiation, thermal transmittance, solar heat gain coefficient (SHGC), façade permeability (moisture and air leakage) wind load or pressure, visible light reflectance both internal and external, colour of surfaces of physical objects (reflected and transmitted) surface reflectance, relative humidity, air quality (adjacent to and distant from the building façade), airborne particle count and airborne mold/fungal spore count in both non-habitable and habitable spaces within a building. Other sensors may measure seismic activity and building differential movement at various locations throughout the building. The system and method also includes capturing the sensor data using a data recordal device (50) that is in data communication with a computing device (or central server (110)) and transferring the sensor data to the central server (110). Subsequent to transfer, the sensor data is processed and analysed to generate information that may be viewed and further analysed to assess the performance of the building and the building façade (20).

Figure 1:
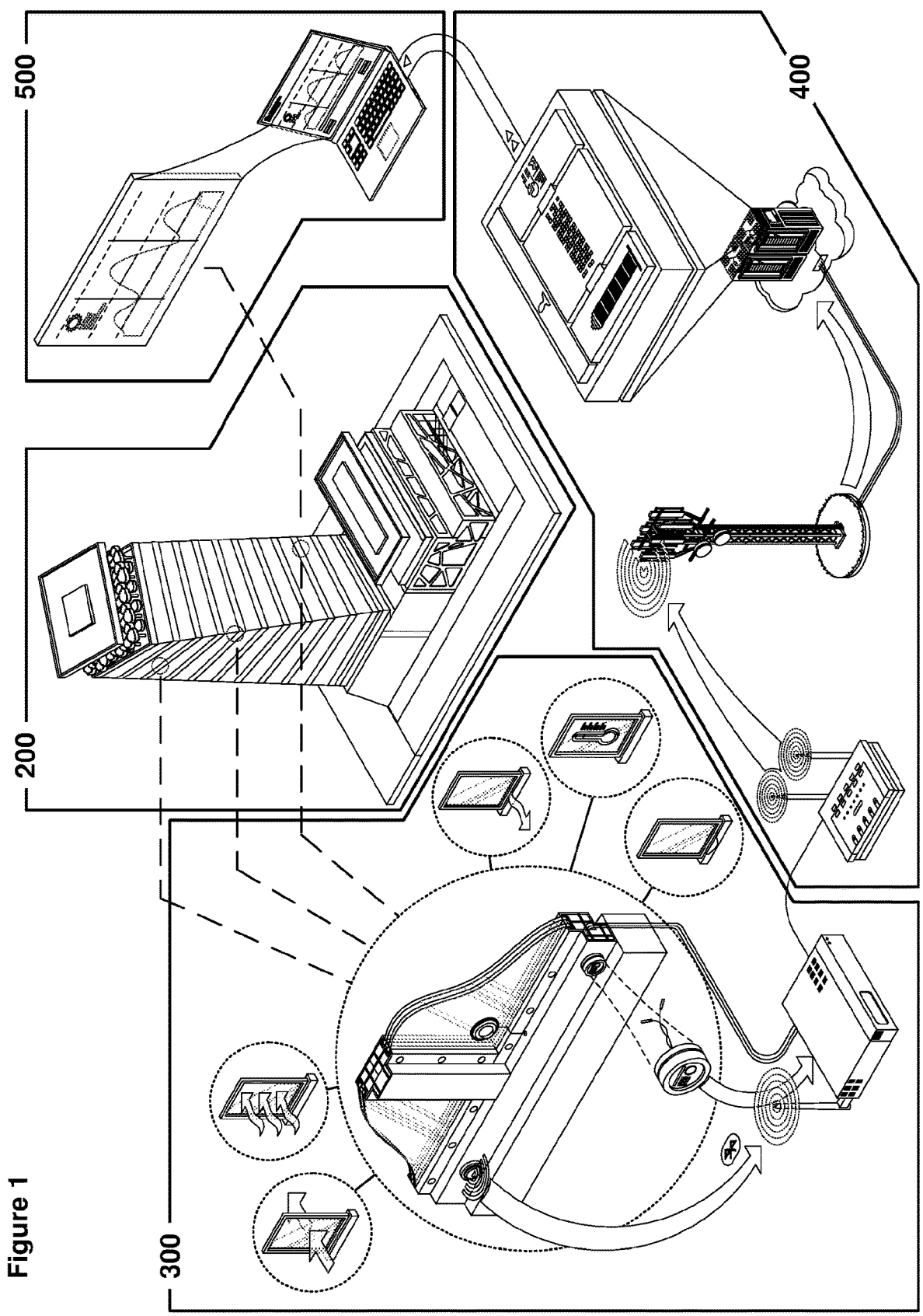
FIG. 1 provides an overview of a system according to an embodiment of the present invention, depicting the interaction between various system components.

FIG. 1 provides an exemplary overview of the system and method of the present invention and is divided into five distinct segments which are further expanded in subsequent FIGS. 2 to 5.

The skilled reader will appreciate that numerous additional implementations are possible and the implementation described in this specification with reference to the Figures is by way of example only and is not intended to be limiting.

Figure 2:
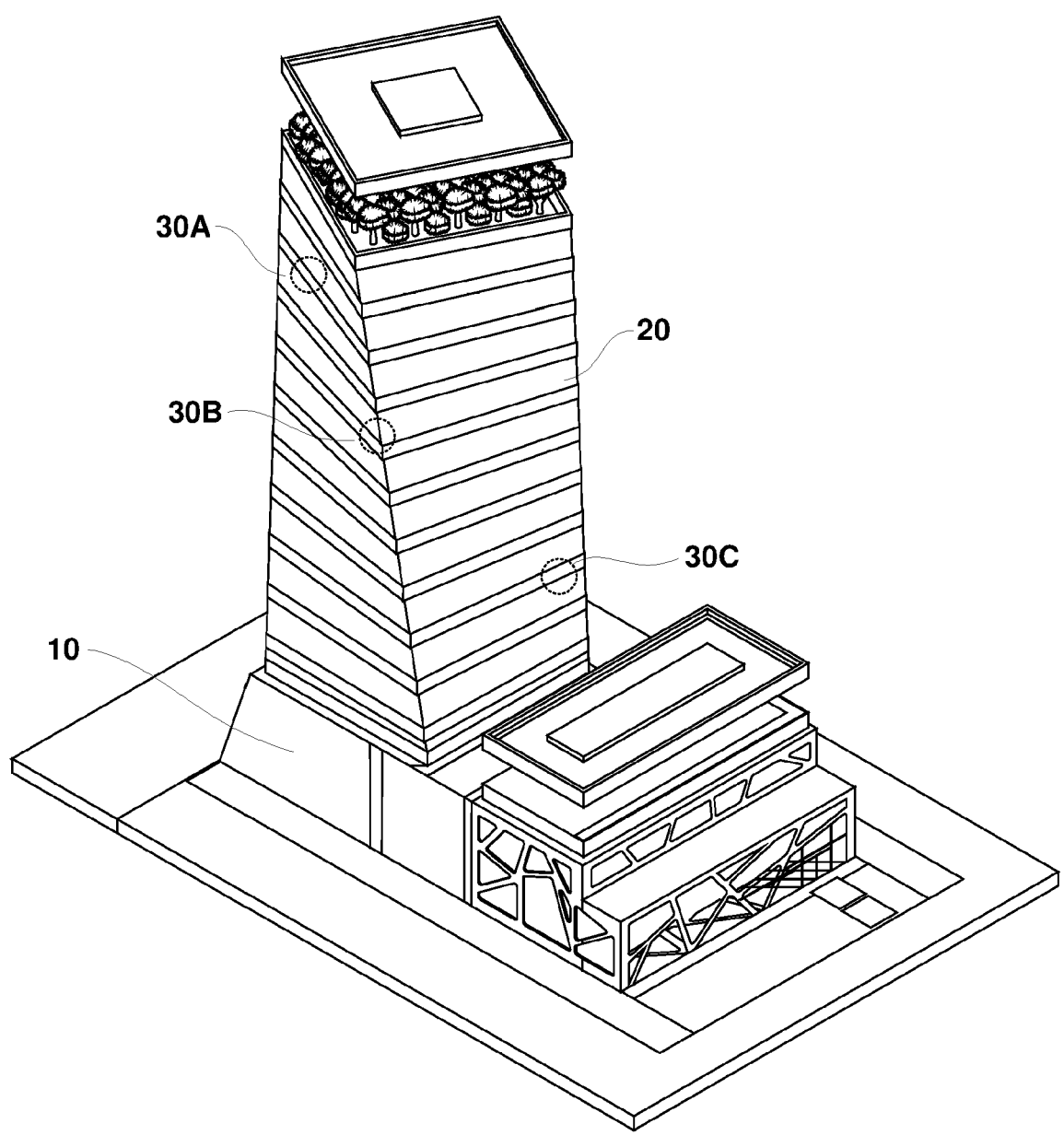
FIG. 2 illustrates a building with a façade that is installed with a plurality of sensors to capture data continuously with respect to various parameters that may be used to assess the performance of the façade according to an embodiment of the present invention.

For example, in FIG. 1, segment 200 shows building (10) being monitored to assess the performance of the building and in particular, the building façade (20). Exemplary monitoring points (30A, 30B and 30C) located on the building façade (20) are shown in FIG. 2. Segment 300 of FIG. 1 shows a façade monitoring point (30) in greater detail and provides examples of some environmental parameters (70, 72, 74, 76 and 78) that may be monitored using the system and device according to an embodiment of the present invention. Segment 400 of FIG. 1 depicts how the sensor data is captured by data recordal device (50) and transferred to a central server (110) which processes the sensor data in addition to performing further functionality as will be further described. Segment 500 of FIG. 1 depicts how the sensor data is processed by one or more processors associated with central server (110) which generates further information and analytics that may be used to assess the performance of the building including the building façade (20).

As mentioned above, FIG. 2 depicts further detail in segment 200 from FIG. 1. In particular, FIG. 2 shows building (10) on which monitoring sensors (30A, 30B and 30C) are affixed to the façade (20). To measure the façade's performance, monitoring sensors (40) are placed at different locations on, or in relation to, the building, that takes into account various factors including, but not limited to, the building's location and in particular, it's orientation with respect to the sun and wind, the building's dimensions/height and any shadow effects. Strategic positioning of sensors (40) generates sensor data that may provide a reliable and comprehensive environmental profile of the performance of a building's façade both at the time of practical completion of the façade and subsequently as time passes to the first maintenance period and beyond. Sensors may be strategically positioned to capture data from a façade at each façade orientation (North, South, East and West). Moreover, locations within each façade orientation with differing exposure to environmental parameters such as wind load or pressure, or locations regarded as critical such as corners may capture highly relevant data affecting the building performance. Further, attached building features such as sun shades as well as areas including flat or inclined glazing (e.g. atrium roofing systems, awnings and/or canopies) represent locations at which sensor placement would be sensible and/or recommended.

As previously described, building façades are typically designed to meet or exceed various design specifications and must comply with various building codes and/or standards at the time of construction completion. The embodiment shown in FIG. 2 enables relevant personnel (for example, building owners building developers, consulting engineers and/or architects, building contractors and building façade contractors) to confirm that a building's façade meets all relevant specifications, standards and codes at the time of construction completion subject to the particular scope of the system installation and sensor locations.

The system and method according to the embodiment shown in FIG. 2 also enables relevant personnel to confirm that the façade's performance continues to meet specifications, codes and standards throughout the life of the building with minimal manual intervention and hence provides an efficient and cost effective method of monitoring building and façade performance over time. In embodiments, the system is also able to recommend one or more corrective actions in the event a decrease in the performance of a building is detected over time.

In embodiments, the system is also able to conduct one or more analyses of the sensor data collected over time that enables the future performance of the building façade to be predicted. This information is obtained by conducting trend analysis of the collected data. In other embodiments, the system is also able to recommend targeted, evidence based, corrective actions for remediation of a particular problem affecting the building or its façade. The performance of trend analysis of collected environmental data for a particular building façade is useful as a basis of comparison with trend analysis performance in respect of other buildings including facades of similar age, configuration, geographic location and with similar exposure to the environment.

Figure 3:
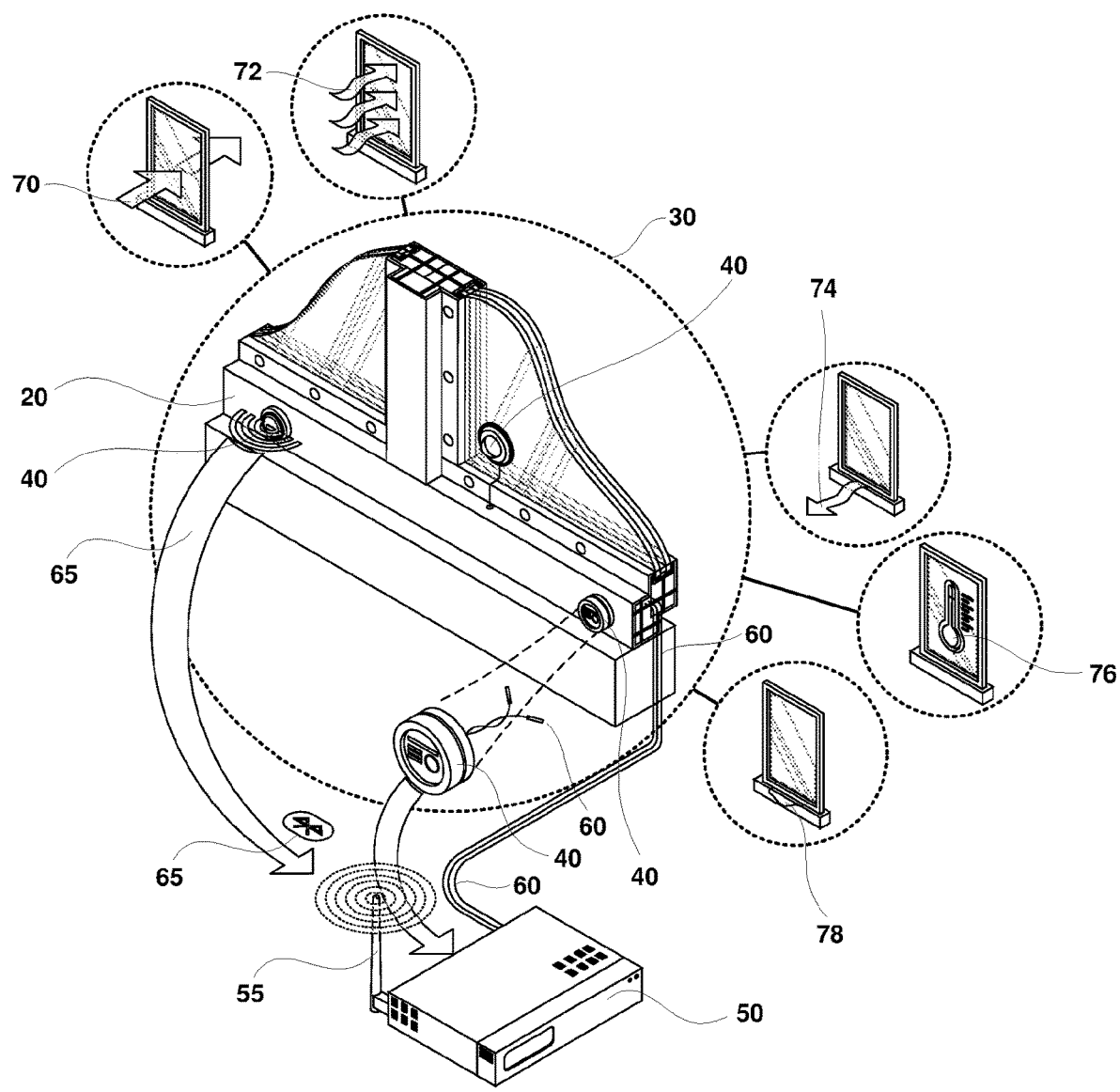
FIG. 3 illustrates a façade monitoring point in greater detail according to an embodiment of the present invention.

FIG. 3 shows further detail of segment 300 in FIG. 1. In particular, FIG. 3 shows a façade monitoring point (30) including three sensors (40) in data communication with a data recording device (50) through a wired connection (60) and also by a wireless connection (65) in which sensor data is received by wireless receiver (55) located on data recording device (50). In this regard, skilled readers will understand that any suitable wireless communication protocol may be employed including, for example, Bluetooth or Wi-Fi protocols. In the embodiment detailed in the Figures, wireless communication of sensor data (40) with the data recording device (50) occurs across a privately owned data communications network for which bandwidth and latency concerns are either not relevant, or can be controlled.

In the embodiment shown in FIG. 3, sensors (40) are configured to measure various environmental parameters including solar radiation (both incident and transmitted solar radiation) (70), wind pressure in internal and external cavities (72), air leaks from, for example, joints and seals (74), temperature including surface and cavity temperatures (76) and moisture within internal cavities (78) and generate various data. Any data (150) generated by sensors (40) is captured by, and recorded on, one or more data recordal device(s) (50) that is/are typically located in a ceiling cavity or service duct of building (10).

Figure 4:
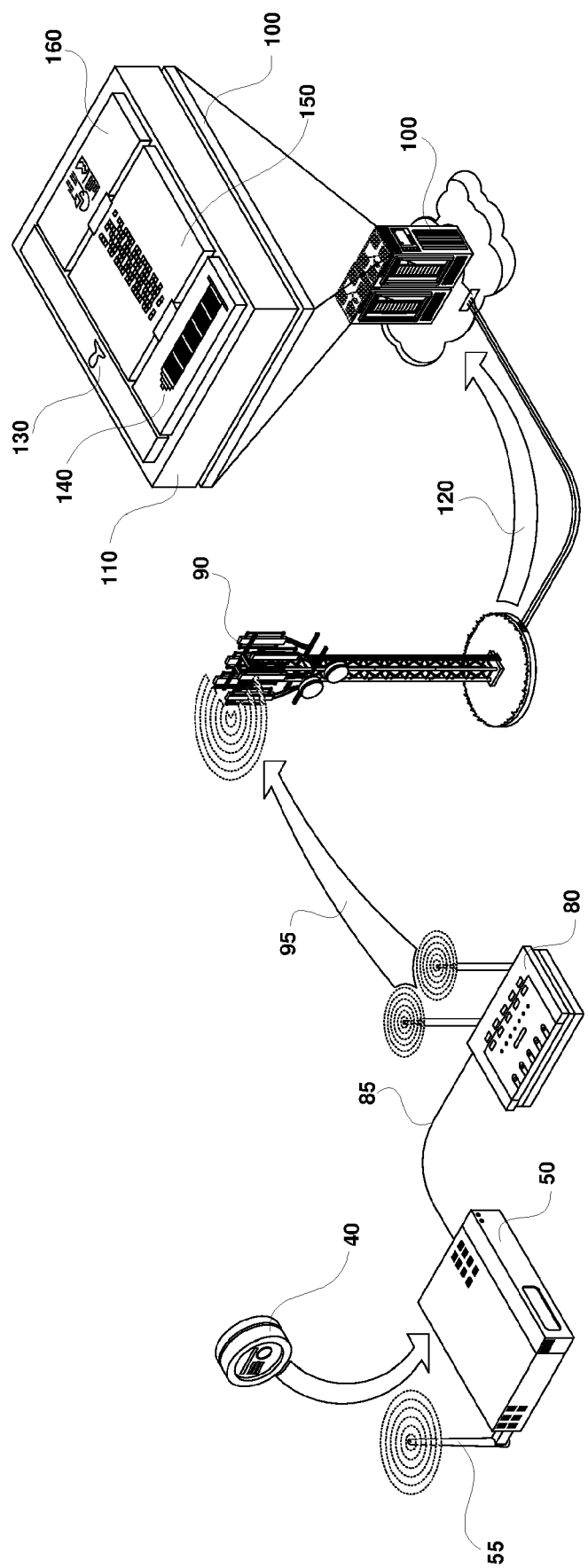
FIG. 4 illustrates the central server (central data store) to which the captured data is transferred, stored and processed according to any embodiment of the present invention.

FIG. 4 shows further detail of segment 400 from FIG. 1. In particular, FIG. 4 shows the components of central server (110) operating on local or cloud-based infrastructure (100). Central server (110) includes user account database (130) in which user information (i.e., user names and passwords) are stored. Accordingly, registered users are able to able to access a system application to view any collected and stored sensor data as will be further described with reference to FIG. 5.

Central server (110) also includes building record database (140) in which details with respect to all of the buildings monitored by the system are stored. Such details include, but are not limited to, a building location, building information including dimensions, year of construction, material of construction etc.), location of monitoring points and sensors with respect to each building being monitored). Central server (110) also includes sensor data storage database (150) for storing sensor data collected over time and analytics database (160) in which any further information (recommendations, predictions) and analytics/statistics generated by the one or more processors associated with central server (110) are stored.

With reference to FIG. 4, any sensor data generated by one or more sensors (40) is captured in data recordal device (50) and transferred to central server (110). The transfer of sensor data from the data recordal device (50) and the central server (110) is achieved by establishing a data communication pathway (85) between the data recordal device (50) and a cellular modem router or gateway (80) and transferring the sensor data over a wireless communication pathway (95) using a cellular tower/mobile data network (90) connected via internet connection with the central server (110) In the embodiment described and depicted in the Figures, the wireless communication pathway (95) occurs across a public data communications network for which bandwidth and latency issues can be problematic.

With further reference to FIG. 4, once the sensor data has been transferred from data recordal device (50) to the central server (110), the data is stored in sensor database (150) and further processed by one or more processors associated with central server (110) to generate further information and analytics which are stored in analytics database (160).

Figure 5:
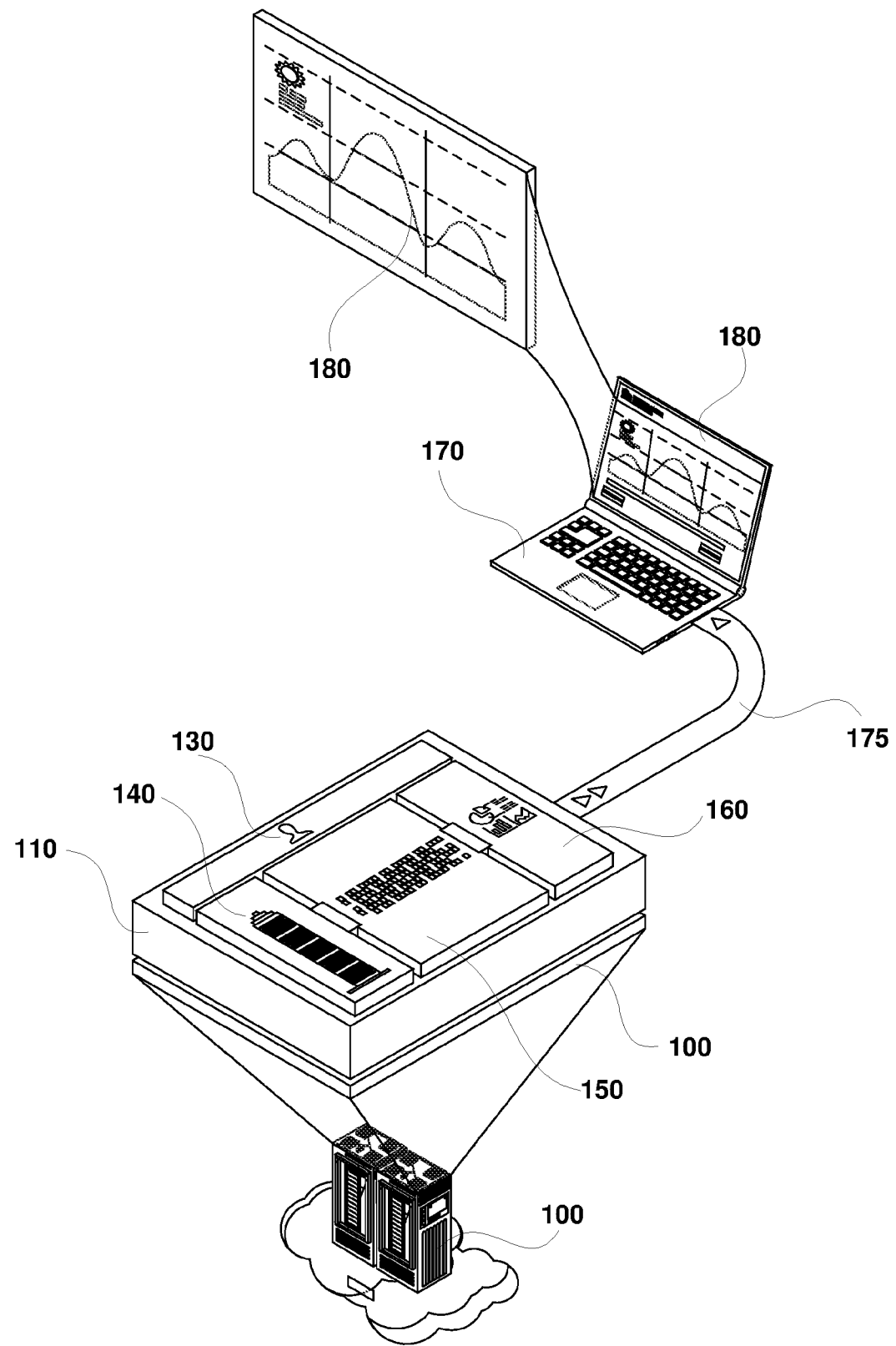
FIG. 5 illustrates how the captured data is used to assess the performance of the building façade according to an embodiment of the present invention.

FIG. 5 shows further detail of segment 500 of FIG. 1 and, more specifically, how sensor data stored in sensor data database (150) and further information and analytics stored in the analytics database (160) located on central server (110) may accessed and viewed by one or more registered and authorized users. In particular, the sensor data and the further information and analytics stored in central server (110), are accessible upon the establishment of a wireless connection (175) between a user device (170) and central server (110). More particularly, one or more authorized users may use the user device (170) and login into system application via a user interface (180) associated with the system application by entering their username and password to access and view the sensor data and information and analytics displayed on the user interface (180) of user device (170). Accordingly, the system application enables authorized users to access and view current and historical sensor data to understand the environmental performance of a building and its façade and whether the façade's performance remains within performance parameters over time.

In embodiments, the sensors attached to a building include sensors that measure or detect the presence of lethal gases such as carbon monoxide in habitable spaces within the building or building differential movement sensors attached to large panes of glass or structural members of the building or its façade. In these embodiments, the data collected from the sensors may indicate an event that represents an immediate threat to human health and safety. In these instances, the data represents more than data that is useful for analysis regarding future performance and should be processed as an urgent event requiring immediate notification.

Since most sensor data is predominantly useful for analysis regarding future actions that may be implemented over a period of time commencing many weeks or months subsequent to collection and analysis of the data, the immediacy of transferring and analyzing that data is limited and delayed transfer analysis of the data may be effected to limit bandwidth consumption of the data communications network and hence preserve latency performance requirements of the network.

As a result of the non-time sensitive nature of most sensor data, the data recordal device may select appropriate time periods in which to transfer data across a publicly accessible data communications network, such as the internet, to an analysis device that may be a cloud based device providing ease of access to a range of devices regarding the results of any analysis performed upon the data and any results from an expert system to which sensor data is submitted and processed.

In an embodiment, data received from a sensor by the recordal device that represents an event considered to represent a potential health and safety risk is categorized or designated as data requiring immediate transfer for notification to the devices that would normally receive the results of analyzed data. Such data is immediately transferred to the analysis device irrespective of the delay constraints usually applied to other, non-urgent, sensor data. In another embodiment, urgent event data is additionally and/or alternatively transferred through a data communications network better suited to transferring urgent data reliably to organizations such as emergency services or fire and rescue services that are specifically prepared to deal with noxious gases and structural failures that affect the health and safety of the public.

Whilst immediate transfer of urgent event data to emergency services personnel detailing the location and type of event is important, transfer of that same data to the analysis device may provide invaluable additional information. In this regard, the analysis device may conduct an analysis of all other data, including data pertaining to the environmental parameters to which the building has been subjected including the environmental parameters within the closest proximity to the event. For example, in the event a pane of glass has cracked with an attached sensor indicating the event as presenting a potential health and safety risk, the analysis device may perform an analysis of the building to determine the presence of other panes of glass that have been subjected to the same environmental parameters. Additionally, the analysis device may perform an analysis of all data collected in respect of similar buildings in reasonably close proximity seeking buildings for which panes of glass have been subject to the same, or similar, conditions as recorded for the pane of glass that has cracked.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to imply the inclusion of a stated feature or step, or group of features or steps, but not the exclusion of any other feature or step or group of features or steps.

Any reference to prior art in this specification is not, and should not be taken as an acknowledgement, or any suggestion that, the prior art forms part of the common general knowledge.

The invention claimed is:

1. A computer-implemented system including:
 a plurality of environmental parameter sensors affixed to, or associated with, a building including a plurality of sensors affixed to components of the building façade and configured to continuously monitor one or more environmental parameters;

the plurality of sensors in data communication with a data recordal device configured to capture sensor data generated by the plurality of sensors; and a computing device in communication with the data recordal device including one or more processors that receive and process the sensor data captured by the data recordal device to thereby assess the performance of the building façade;

wherein the sensors include at least one or more sensors to detect parameters relevant to safety including:
sensors to detect seismic activity;
sensors to detect building differential movement; or
sensors to detect air quality;

wherein the sensors are categorized according to the parameter sensed, and those parameters that could affect safety are flagged, wherein when the parameter value is received by the recordal device from a sensor having a flagged parameter value that includes a value representing an unsafe condition, the recordal of that event is flagged as an event potentially affecting safety; and wherein the sensor data recorded in the recordal device is transferred to the computing device periodically except for flagged data representing an event that could represent an unsafe condition and in the event of the recordal device recording such an event, the corresponding sensor data is immediately transferred to the computing device.

2. The computer-implemented system according to claim 1 wherein the sensors are continuously and regularly monitored and data obtained therefrom is recorded by the recordal device.

3. The computer-implemented system according to claim 1, wherein sensors affixed to components of a building to sense environmental parameters affecting a thermal performance, energy or comfort of a building include any one or more of the following:
sensors to detect incident solar radiation:
sensors to detect transmitted solar radiation;
sensors to detect thermal transmittance;
sensors to detect solar heat gain coefficient;
sensors to detect façade permeability parameters;
sensors to detect façade wind load;
sensors to detect moisture;
sensors to detect airflow;
sensors to detect color of surfaces and/or physical objects;
sensors to detect air temperature; and
sensors to detect airflow within inhabited spaces.

4. The computer-implemented system according to claim 1, wherein the performance of a building is assessed by analyzing all data recorded by all sensors and comparing same with parameters required to satisfy building requirements.

5. The computer-implemented system according to claim 1, wherein the computing device performs a trend analysis with respect to the sensor data to detect trends from which deductions regarding future building performance are resolved.

6. The computer-implemented system according to claim 1, wherein the computing device includes an expert system module that analyses the collected sensor data including historical sensor data and determines corrective actions required to improve or rectify building performance.

7. A computer-implemented method including:
continuously monitoring, by a plurality of sensors affixed to, or associated with, a building including a plurality of sensors affixed to components of the building façade, one or more parameters including environmental parameters, wherein the plurality of sensors are in data communication with a data recordal device configured to capture sensor data generated by the plurality of sensors, wherein the sensors include at least one or more sensors to detect parameters relevant to safety including:
sensors to detect seismic activity;
sensors to detect building differential movement; or
sensors to detect air quality;
transferring the sensor data to a computing device that is in communication with the data recordal device;
processing, by one or more processors associated with the computing device, the sensor data captured by the data recordal device to thereby assess the performance of the building;
categorizing the sensors according to the parameter sensed and flagging those parameters that could affect safety, and when the parameter value is received by the recordal device from a sensor having a flagged parameter value that includes a value representing an unsafe condition, flagging the recordal of that event as an event potentially affecting safety; and
transferring the sensor data recorded in the recordal device to the computing device periodically except for flagged data representing an event that could represent an unsafe condition, and in the event of the recordal device recording such an event, immediately transferring the corresponding sensor data to the computing device.

8. A non-transitory computer-readable medium having a plurality of instructions executable by one or more processors of a computing device to perform the steps of:
continuously monitoring, by a plurality of sensors affixed to, or associated with, a building including a plurality of sensors affixed to components of the building façade, one or more parameters including environmental parameters, wherein the plurality of sensors are in data communication with a data recordal device configured to capture sensor data generated by the plurality of sensors, wherein the sensors include at least one or more sensors to detect parameters relevant to safety including:
sensors to detect seismic activity;
sensors to detect building differential movement; or
sensors to detect air quality;
transferring the sensor data to a computing device that is in communication with the data recordal device;
processing, by one or more processors associated with the computing device, the sensor data captured by the data recordal device to thereby assess the performance of the building;
categorizing the sensors according to the parameter sensed and flagging those parameters that could affect safety, and when the parameter value is received by the recordal device from a sensor have a flagged parameter value that includes a value representing an unsafe condition, flagging the recordal of that event as an event potentially affecting safety; and
transferring the sensor data recorded in the recordal device to the computing device periodically except for flagged data representing an event that could represent an unsafe condition, and in the event of the recordal device recording such an event, immediately transferring the corresponding sensor data to the computing device.

* * * * *